(12) United States Patent
Kemmler

(10) Patent No.: US 10,467,207 B2
(45) Date of Patent: Nov. 5, 2019

(54) HANDLING CHANGES IN AUTOMATIC SORT

(71) Applicant: Andreas Kemmler, Beonnigheim (DE)

(72) Inventor: Andreas Kemmler, Beonnigheim (DE)

(73) Assignee: SAP SE, Walldorf (DE)

( * ) Notice: Subject to any disclaimer, the term of this patent is extended or adjusted under 35 U.S.C. 154(b) by 1411 days.

(21) Appl. No.: 13/902,666

(22) Filed: May 24, 2013

(65) Prior Publication Data

US 2014/0351272 A1 Nov. 27, 2014

(51) Int. Cl.
G06F 16/21 (2019.01)

(52) U.S. Cl.
CPC .................. G06F 16/217 (2019.01)

(58) Field of Classification Search
CPC ........... G06F 17/30289; G06F 17/3033; G06F 17/30424; G06F 16/217
USPC ....... 707/722, 747, 803, 610, 692, 714, 724, 707/737, 741, 743, 756, 759, 769, 770, 707/798, 752
See application file for complete search history.

(56) References Cited

U.S. PATENT DOCUMENTS

| | | |
|---|---|---|
| 4,611,280 A | 9/1986 | Linderman |
| 5,668,992 A | 9/1997 | Hammer et al. |
| 6,304,867 B1 | 10/2001 | Schmidt |
| 7,076,762 B2 | 7/2006 | Fisher |
| 7,139,745 B2 | 11/2006 | Nakamura et al. |
| 7,325,015 B2 | 1/2008 | Zhou et al. |
| 7,457,807 B2 | 11/2008 | O'Conor |
| 7,519,972 B2 | 4/2009 | Carr et al. |
| 7,533,380 B2 | 5/2009 | Neuer et al. |
| 7,577,722 B1 | 8/2009 | Khandekar et al. |
| 7,624,114 B2 | 11/2009 | Paulus et al. |
| 7,702,638 B2 | 4/2010 | Tsyganskiy et al. |
| 7,725,483 B2 | 5/2010 | Poyourow et al. |

(Continued)

FOREIGN PATENT DOCUMENTS

| | | |
|---|---|---|
| EP | 2019358 A1 | 1/2009 |
| EP | 2722754 A1 | 4/2014 |

OTHER PUBLICATIONS

Patrick Ian Cromody, Development and Maintenance of Computer Databases WO 2005072047, Filed Jan. 31, 2005.*

(Continued)

*Primary Examiner* — James Trujillo
*Assistant Examiner* — Hubert Cheung
(74) *Attorney, Agent, or Firm* — Schwegman Lundberg & Woessner, P.A.

(57) ABSTRACT

In an example embodiment, a tri-state variable associated with a table in a database indicates whether the table is automatically sorted at runtime or left unsorted. The value of the tri-state variable also indicates whether code associated with the table assumes the table will be sorted at runtime. In a situation where two parties have code that utilize the table, when the first ensures its code to no longer assumes the table will be sorted, they may set the value of the tri-state variable from automatic sorting enforced to automatic sorting recommended. In this state the table will still be automatically sorted at runtime. When the second ensures its code no longer assumes the table will be sorted, they may set the value of the tri-state variable from automatic sorting recommended to no automatic sort at which time the table is left unsorted.

20 Claims, 9 Drawing Sheets

(56) References Cited

U.S. PATENT DOCUMENTS

| | | | |
|---|---|---|---|
| 7,774,369 B2 | 8/2010 | Herzog et al. | |
| 7,870,499 B2 | 1/2011 | Latzina et al. | |
| 8,024,237 B1 | 9/2011 | Davidson et al. | |
| 8,112,738 B2 | 2/2012 | Pohl et al. | |
| 8,135,813 B2 | 3/2012 | Gonzalez et al. | |
| 8,176,094 B2 | 5/2012 | Friedman | |
| 8,200,557 B2 | 6/2012 | Kahn et al. | |
| 8,255,350 B2 | 8/2012 | Lindenlaub | |
| 8,321,948 B2 | 11/2012 | Robinson et al. | |
| 8,332,813 B2 | 12/2012 | Arsanjani et al. | |
| 8,352,919 B2 | 1/2013 | Misch et al. | |
| 8,397,283 B2 | 3/2013 | Hayler et al. | |
| 2003/0126130 A1* | 7/2003 | Martino et al. | 707/7 |
| 2003/0167455 A1* | 9/2003 | Iborra et al. | 717/105 |
| 2003/0220901 A1 | 11/2003 | Carr et al. | |
| 2005/0021543 A1 | 1/2005 | Schmitt et al. | |
| 2005/0262059 A1* | 11/2005 | White | 707/3 |
| 2007/0027867 A1* | 2/2007 | Ichino | 707/6 |
| 2007/0130031 A1 | 6/2007 | Esau et al. | |
| 2007/0226227 A1 | 9/2007 | Helfman | |
| 2007/0233820 A1 | 10/2007 | Schneider | |
| 2007/0276948 A1 | 11/2007 | Burdett et al. | |
| 2009/0249279 A1 | 10/2009 | Bourdon | |
| 2009/0300586 A1 | 12/2009 | Bernardini et al. | |
| 2009/0300593 A1 | 12/2009 | Faus et al. | |
| 2010/0005461 A1 | 1/2010 | Shribman et al. | |
| 2010/0191764 A1 | 7/2010 | Aluf-Medina | |
| 2011/0320451 A1 | 12/2011 | Boh et al. | |
| 2012/0005190 A1 | 1/2012 | Faerber et al. | |
| 2012/0051535 A1 | 3/2012 | Klein et al. | |
| 2012/0158821 A1 | 6/2012 | Barros | |
| 2012/0179698 A1 | 7/2012 | Muras | |
| 2012/0323923 A1 | 12/2012 | Duan | |
| 2014/0143260 A1* | 5/2014 | Simonson et al. | 707/752 |

OTHER PUBLICATIONS

"European Application Serial No. 141913053.3., Search Report dated Mar. 16, 2015", 10 pgs.

"U.S. Appl. No. 14/074,335, Non Final Office Action dated Aug. 27, 2015", 11 pgs.

"European Application Serial No. 14191305.3, Office Action dated Aug. 24, 2015", 13 pgs.

* cited by examiner

HANDLING CHANGES IN AUTOMATIC SORT

TECHNICAL FIELD

This disclosure relates to changes that impact underlying system operation, such as in a database. More particularly, this disclosure relates to handling changes in database tables that are converted from automatic sort to no automatic sort.

BACKGROUND

As systems are upgraded and improved, sometimes changes are made that changes the basic underlying operation of a system. For example, a database system may make a change that impacts how or when tables are sorted. Code that depends on the prior operation of the system may become inoperable when such a change is made.

DETAILED DESCRIPTION

The description that follows includes illustrative systems, methods, techniques, instruction sequences, and computing machine program products of illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
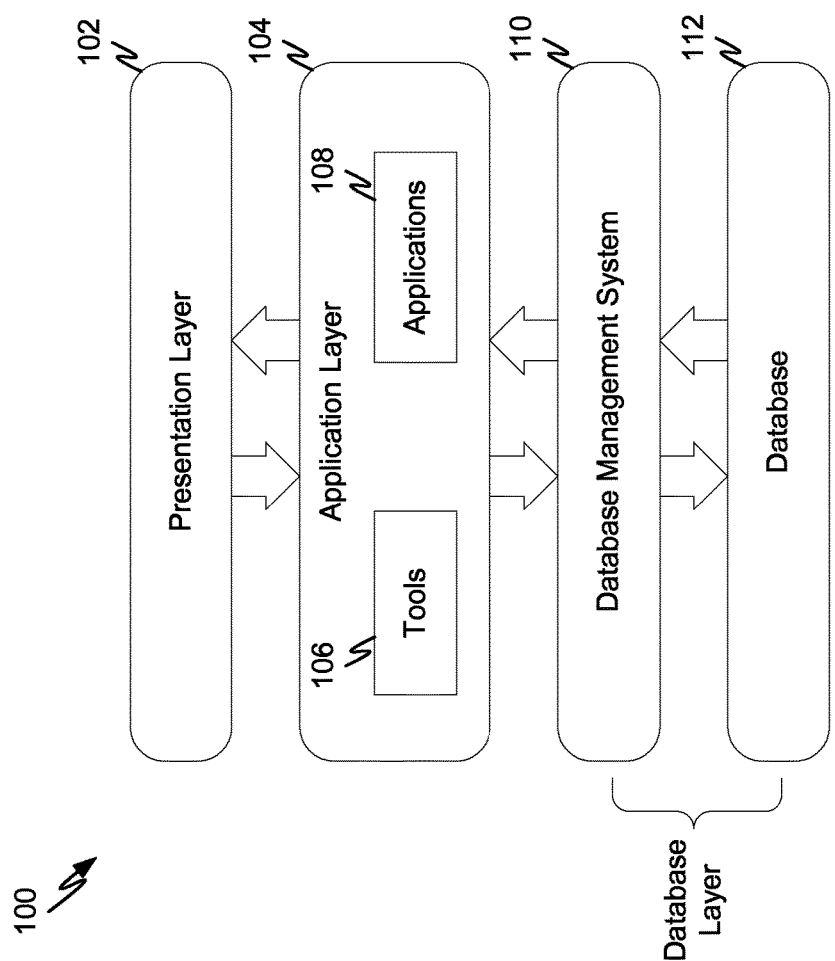
FIG. 1 is a diagram illustrating an example multitier application environment.

FIG. 1 is a diagram illustrating an example multitier application environment 100. Such an environment may be used, for example, in enterprise level applications. In a multitier application environment, the application functions are distributed among multiple tiers or layers in order to gain flexibility in deployment, hardware, scalability, reuse/redeployment, or other advantages. In this disclosure, the terms "tier" and "layer" will be used interchangeably.

In this type of environment, the top layer is typically referred to as the presentation layer 102. The presentation layer provides a means of input, allowing users to manipulate the system, produce results, etc. The presentation layer often provides a graphical user interface (GUI) on individual machines. However, the presentation layer may also use servers, virtual machines, or other "backend" type machines to present a user interface via a browser or other thin client.

The application layer 104 is where business logic is executed and may include various physical or virtual machines. In the context of this disclosure business logic means functionality such as various applications 108 and/or tools 106 that perform processing. Applications 108 and/or tools 106 may be any type of applications and/or tools and need not specifically be associated with a business or operation of a business, although in many instances they may be.

The database layer (collectively 110 and 112) holds the data needed for functioning of the application layer 102 and/or presentation layer 104. The database layer typically includes one or more database management systems 110 along with their associated database(s) 112. In many instances the database system will be a relational database system.

As discussed below, mechanisms may be put in place to make the application layer independent of the specific database system used in the database layer. This allows applications 108 and tools 106 to take advantage of various deployments/implementations without tying applications and tools to a specific database. The mechanisms may include a data dictionary that contains definitions and other information that can be used by system components.

Figure 2:
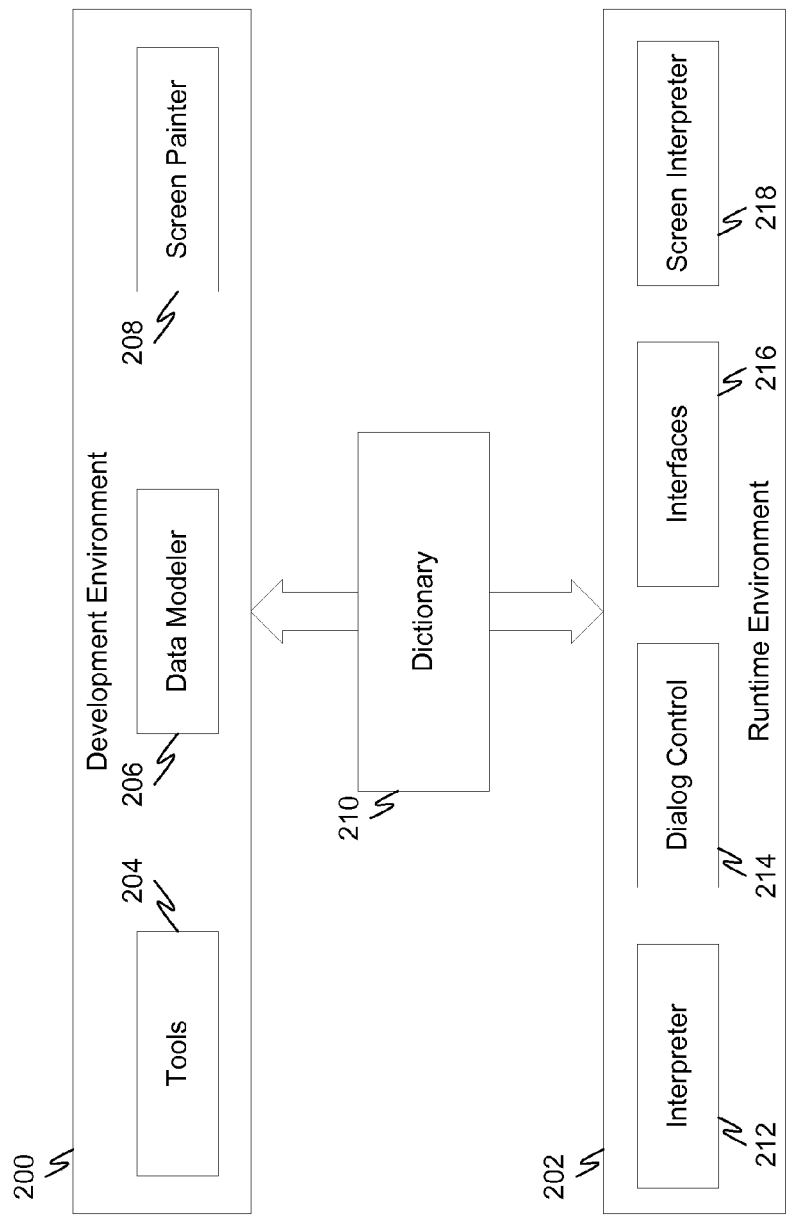
FIG. 2 is a diagram illustrating use of an example data dictionary in both a development and runtime environment.

FIG. 2 is a diagram illustrating use of an example data dictionary in both a development and runtime environment. Data dictionary 210 may be used to create and manage data definitions (e.g., metadata). Data dictionary 210 may store information that, among other things, map information in an application to an underlying database. As an example only, consider a system such as an inventory system produced by a provider of such systems. The inventory system needs a database to function properly. Various purchasers of the inventory system may utilize different databases. Data dictionary 210 permits a central description of all the data used in the inventory system without redundancies. New or modified information may be automatically provided for all the system components. This ensures data integrity, data consistency and data security.

Data dictionary 210 may support the creation of various data structures and/or data types such as data elements, structures, and table types. Corresponding objects may be created in underlying relational database(s) using these definitions. Data dictionary 210 may describe the logical structure of objects used in application development and may show how these objects are mapped to the underlying relational database in tables and/or views. The dictionary may also provide functions for editing fields on the screen, such as assigning input to a screen field, for example.

Information stored in data dictionary 210 may include tables, views, types, domains, search helps, lock objects, etc. Tables are defined in the dictionary independently of the database. A table having the same structure may then be created from this table definition in the underlying database. Views are logical views on more than one table. The structure of the view is defined in the data dictionary. A view on the database can then be created from this structure. The structure of a type can be defined globally so that changes to a type automatically take effect in all the programs using the type. Lock objects are used to synchronize access to the same data by more than one user. Function modules that can be used in application programs are generated from the definition of a lock object in the data dictionary. Different fields having the same technical type can be combined in domains. A domain defines the value range of all table fields and structure components that refer to this domain.

In FIG. 2, data dictionary 210 may be used by both development environment 200 and runtime environment 202. Development environment 200 and runtime environment 202 are representative examples only and actual development and/or runtime environments may have more or fewer components than illustrated in FIG. 2.

Development environment 200 may comprise tools 204, data modeler 206, and screen painter 208. Tools 204 represent tools provided as part of the development environment and may include such things as integrated development environment (IDE) editors, compilers, syntax checkers, etc. Data modeler 206 may be used to create data models according to a particular method or paradigm such as SAP's Structured Entity Relationship Model (SERM). It may also allow data models thus created to be mapped to data dictionary 210. Data modeler 206 may use a graphical editor, which allows data models to be designed as if a user was drawing the model on a drawing board. A data model typically comprises numerous components in a hierarchy. For example, a data model of a university may have entity types of Professors and Students and a relationship between them labeled Teachers. Professors may be organized into Colleges and Students may be organized into Majors, etc.

Screen painter 208 may allow a user to create user interfaces in the presentation layer. User interfaces are normally associated with one or more screens and have various interface elements, possibly with associated attributes. Such interface elements may include entities such as input/output fields, field names, checkboxes, radio buttons, group boxes, sub-screens, etc. The various fields, etc. may be bound to data structures and/or definitions in the data dictionary.

The development environment 200 may include other components and/or functionality to provide all the entities needed to develop and maintain applications and/or tools in the application layer, screens and/or other user interface elements in the presentation layer and functionality and data associated with the database layer.

Runtime environment 202 may include a variety of components and/or functionality to allow execution of the applications, interfaces, etc. developed in the development environment. FIG. 2 illustrates runtime environment as comprising interpreter 212, dialog control 214, interfaces 216 and screen interpreter 218. Applications, tools, and other components may comprise executable instructions that are executable on a processor. Such executable instructions may be directly executable, such as machine code, or may exist in a higher-level language or intermediate language. Interpreter 212 can be part of the runtime environment to execute executable instructions during runtime. The interpreter 212 may be responsible for semantic processing of data. Dialog control 214 may be responsible for displaying and controlling dialog boxes and other user input type mechanisms. Interfaces 216 may represent the interfaces and other interface data associated with runtime environment 216. Screen interpreter 218 may provide semantic interpretation of screens, such as those developed by screen painter 208.

Figure 3:
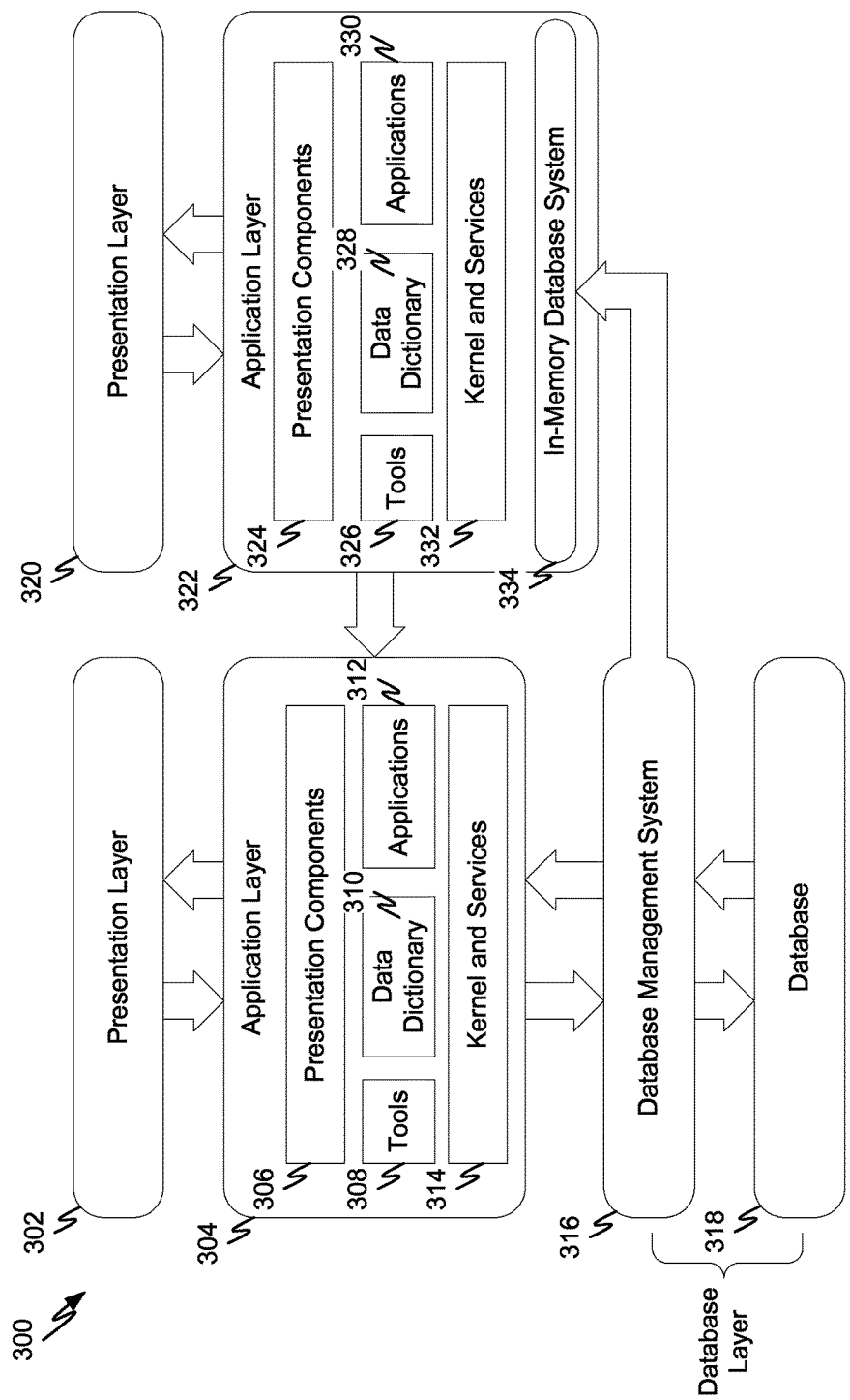
FIG. 3 is a diagram illustrating an example multitier application environment.

FIG. 3 is a diagram illustrating an example multitier application environment. The embodiment of FIG. 3 may illustrate various options, thus not every component illustrated in FIG. 3 may be provided for every specific embodiment.

The embodiment of FIG. 3 may represent a side-by-side deployment where an in-memory database is deployed on the side of a standard database management system. This may have several advantages, including acceleration of data read and/or writes. A side-by-side type of deployment may also allow acceleration without substantial changes in the existing deployment (e.g., presentation layer, application layer, database layer). In one type of side-by-side deployment, reads and/or writes that would normally be directed to the database layer are handled by the in-memory database instead. The in-memory database may interact with database management system 316 and/or database 318.

Such a side-by-side deployment may include presentation layer 302, application layer 304, database management system 316, database 318 and in-memory database 334, possibly deployed in either the same application layer (e.g., 304) or a different application layer (e.g., 322). An application layer may comprise presentation components (e.g., 306, 324). Presentation components may include components such as screen interpreter(s), interfaces, dialog control, etc. An application layer may also comprise kernel and services (e.g., 314, 334). Kernel and services may include components such as an interpreter and/or other components that implement the runtime environment. An application layer may also comprise tools (e.g., 308, 326) and/or applications (e.g., 312, 330). An application layer may also comprise a data dictionary (e.g., 310, 328) to provide information, data structures, definitions, etc. as previously discussed.

FIG. 3 may also illustrate a "2-layer" model where an in-memory database runs in the application layer along with any applications and/or tools. In this type of deployment, application layer 322 may be supported by presentation layer 320.

Figure 4:
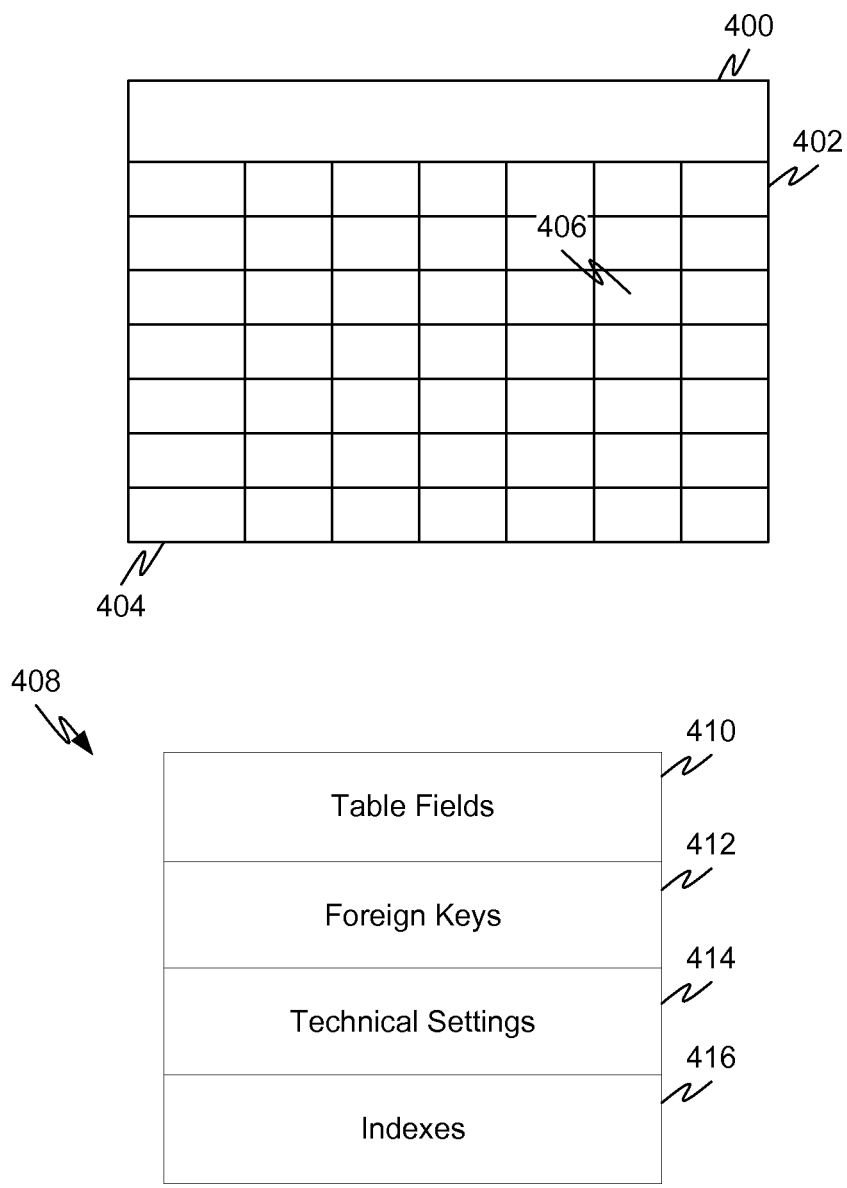
FIG. 4 is a diagram illustrating an example table and table definition.

FIG. 4 is a diagram illustrating an example table and table definition. An example table 400, such as used in a database typically has a plurality of fields, which may be visually represented as the columns 404 in the table 400. One or more fields may be a key on which the table may be sorted. Key fields are also used for other purposes, such as precisely identifying a record, helping to establish and enforce various types of integrity, establish relationships between other tables, etc. Specific key field(s) are not represented in FIG. 4, but such a field would be a column within the table (or multiple columns for multiple keys). Individual records, generally comprising one or more fields, may be represented as rows 402 of the table 400. The intersection of a row and column 406 is where a value for a particular field of a particular record may be stored.

To define a table, various metadata may be used. FIG. 4 illustrates the metadata to define a table in one representative example generally as 408. The illustrated metadata may comprise table fields 410, which defines the field names and data types of the fields contained in the table, including key(s). Foreign keys 412 may define the relationship between the table and other tables. Technical settings 414 may control the creation of the table in the database. This includes such things as, data class, which defines the physical area of the database (table space) in which the table should be created, size category, which defines the size of the extents created for the table. Technical settings 414 may also include such things like buffering permission, which defines whether a table may be buffered, the buffering type which defines how many table records are loaded into the buffer when a table entry is accessed, logging, which identifies whether changes to the table are logged, and other such behavior. Indexes 416 may include secondary indexes that are created to speed up data selection. Metadata 408 may also include other appended structures, customized parameters etc. (not shown).

Figure 5:
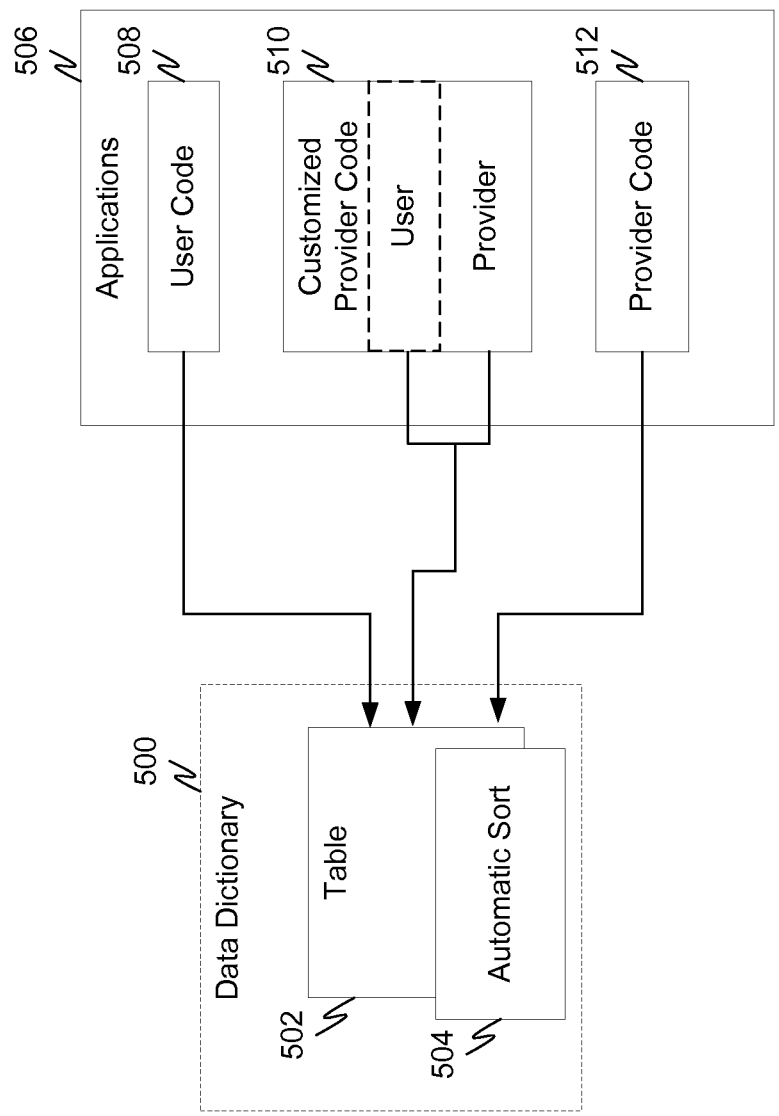
FIG. 5 is a diagram illustrating an example application with various code sources.

FIG. 5 is a diagram illustrating an example application with various code sources. In FIG. 5, application(s) 506 utilize table 502 defined in data dictionary 500. The source code from application(s) 506 may arise from a variety of sources. Some code may be user created code 508. Other code may be provider code 512. Provider code in this context is any code that is obtained by a user and not created by the user. User in this context is the entity or individual responsible for application(s) 506 such as a company, IT department, system manager, etc. Some code may be obtained from a provider and then customized or adapted by the user as illustrated by 510.

When any of the code in application(s) 506 is created, it may have made certain assumptions about how table 502 behaves. In one example, the operating system, database, runtime environment, etc. may be expected to automatically sort table 502 upon initialization or some other event. Thus, user code 508, customized provider code 510 and provider code 512 may depend on table 502 being automatically sorted to operate properly. However, due to changes in the runtime, operating system, database, and/or changes in table 502 itself, or some other factor or factors, when that assumption is no longer appropriate (e.g., cannot be relied on), a mechanism can be provided to ease the transition until changes can be made in the appropriate code to remove that assumption and ensure proper operation of the code. As used herein the term "runtime environment" is taken to mean one or more of operating system(s), database, runtime, etc. that influence how table 502 is treated and whether the assumptions are enforced or not.

In one example embodiment a tri-state variable may be associated with table 502 that identifies how the system should handle 502. FIG. 5 represents this tri-state variable as automatic sort variable 504. The state of automatic sort 504 represents the state of the assumption made by code, such as user code 508, customized provider code 510 and provider code 512, with respect to the particular variable that is represented. In the embodiment of FIG. 5, tri-state variable 504 represents the state of assumptions for code 508, 510 and 512 with respect to automatic sorting of table 502.

Although FIG. 5 specifically illustrates a table and an associated tri-state variable representing the state of assumptions relative to automatic sorting of that table, any data structure may be associated with a tri-state variable for any particular assumptions. For example, a data structure may have a tri-state variable associated with it representing assumptions on its initialized state, or how the operating system or runtime environment handles the data structure. Basically any assumption about behavior expected by a body of code may be thus represented.

The variable is tri-state since multiple actors are responsible for the code. The three states of the variable represent the state of assumptions for the multiple actors' code. The tri-state variable actually belongs to the data structure (such as a table). The entity that owns the definition to the data structure also owns the tri-state variable and the runtime environment may enforce appropriate state transitions (discussed later) made by various entities consistent with policies about allowable state transitions made or requested by the various entities. This aspect is discussed in conjunction with FIG. 7 below.

The value of the tri-state variable affects operation of the runtime environment with respect to table 502. In a representative embodiment, the value of the tri-state variable operates as summarized in Table 1 below. In Table 1 below, how the behavior of the data structure is couched in terms of a function provided. Thus, in the case where the code relies on an automatic sort of the table, the function provide by the runtime is automatic sorting of the table. Thus, the term function in this instance may be a literal function provided by the runtime or may be a behavior provided by the runtime.

TABLE 1

| Tri-State Variable | | | |
|---|---|---|---|
| Value | Provider Code Assumption | User Code Assumption | Runtime Behavior |
| Function Enforced | Relies on function | Any | Function provided |
| Function Recommended | Does not rely on function | Relies on behavior | Function provided |
| Function Not Provided | Does not rely on function | Does not rely on behavior | Behavior not provided |

As summarized in the table, the tri-state variable may have three states: a function (or behavior) enforced state, a function (or behavior) recommended state, and a function (or behavior) not provided state. In the function enforced state, the provider code (e.g., the "owner" of the tri-state variable) assumes the function will be provided. In general, the user code may also assume the function will be provided, but in such a state it doesn't really matter. The runtime will ensure the expected behavior will be observed in this state. Once the provider code has been changed and/or evaluated to ensure that there is no reliance on the behavior, the provider may change the value of the tri-state variable to the function recommended state. This is a signal to users of the provider code that the code has removed any reliance on the behavior. However, it may be that user code still relies on the behavior. Thus in this state, the runtime still enforces the behavior and provides it as expected. Once user code has been changed and/or evaluated so that it no longer relies on the behavior, the variable may be changed to the function not provided state. At this time the runtime may cease providing the behavior (and theoretically may be removed from the runtime all together). Among other things, this generally allows faster execution of the code and/or runtime functionality.

Although a tri-state variable is used, in general, the number of states a variable has may be one more than the number of groups that the variable tracks assumptions for. In the above example, there are two groups: a provider (which owns the variable and has code that uses the data structure) and a user (which may have code that also uses the data structure). Thus a tri-state variable is sufficient. A tri-state variable is also sufficient for multiple users as long as the variable state represents the assumption for the multiple users as a whole. Similar analysis applies for multiple providers. To track users and/or providers separately (rather than as a whole) additional states may be introduced to track their assumptions relative to the code. In such an embodiment, the runtime would provide the function as long as any tracked entity still made the assumption that the function would be provided. Once all entities no longer needed the function to be provided, the runtime would cease providing it.

Figure 6:
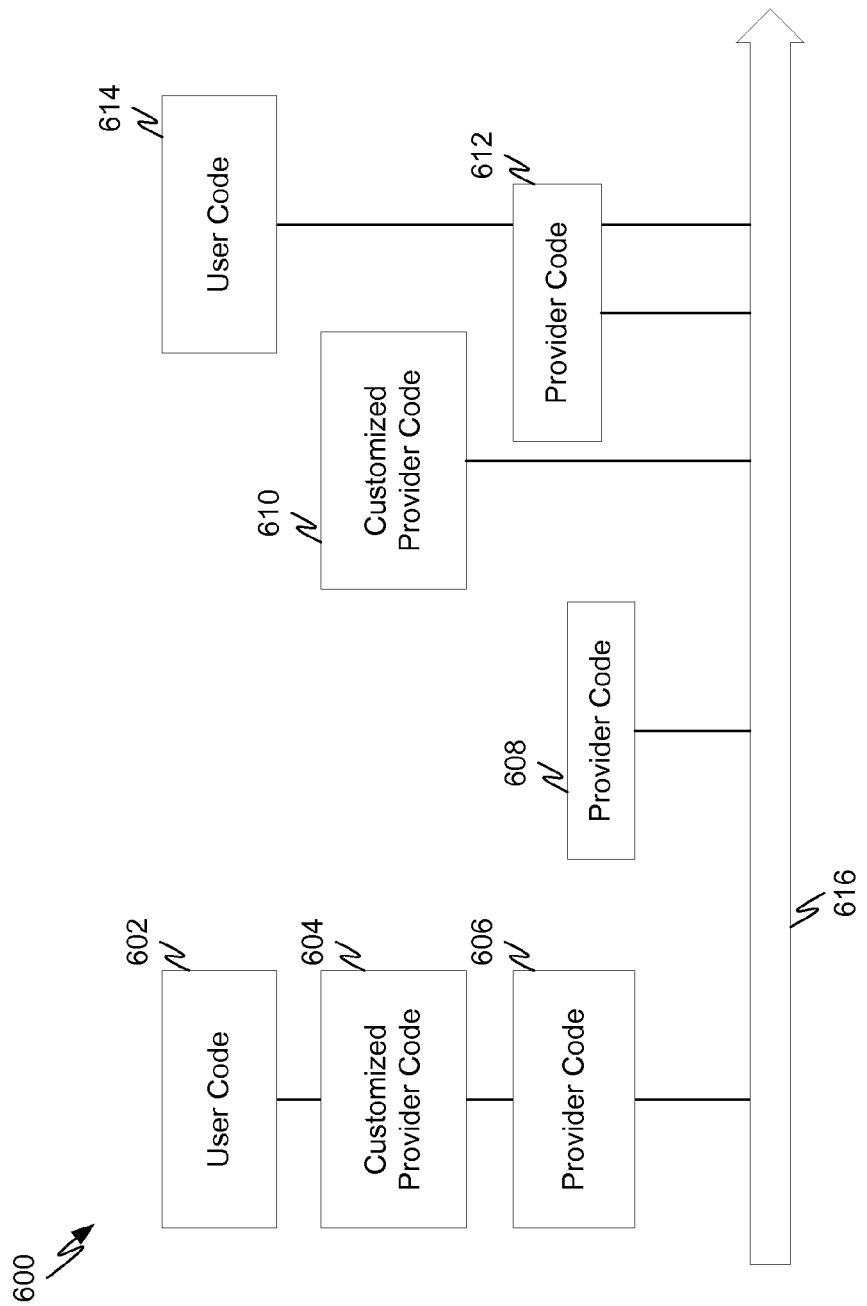
FIG. 6 is a diagram illustrating an example code update schedule.

FIG. 6 is a diagram illustrating an example code update schedule. This diagram illustrates, for example, how complex code releases may become when multiple parties code all use the same data structure and rely on a particular function to be provided by the runtime.

FIG. 6 represents the example code update schedule generally as 600. Time is increasing to the right of the diagram as shown by arrow 616. At some initial point, user code 602, customized provider code 604 and provider code 606 have some initial state with respect to their assumptions regarding a data structure. In one example this may represent the state where all code relies on a particular functionality to be provided with respect to the data structure. According to Table 1, the associated tri-state variable may be in the "function enforced" state.

At some time, provider code 606 is updated to remove the assumption. FIG. 6 illustrates this by provider code 608. However, the variable state may not updated since customized provider code 604 still hasn't been updated. When customized provider code 604 is updated, as illustrated by customized provider code 610, the variable state may be updated to "function recommended" since all provider code has now been evaluated and/or changed to remove the assumption. Note that this state change may occur even though the user customizations of customized provider code 610 have not yet been updated.

The next code release is provider code 612, which updates provider code 608. If provider code 612 still does not rely on the function, then the state may remain at "function recommended." However, if a problem is noticed or an error has occurred in ensuring that the provider code does not rely on the function, then the state may be "increased" again to "function enforced." The exact dynamics of the state change are discussed more fully in conjunction with FIG. 7.

The next code release illustrated in FIG. 6 is user code 614, which updates user code 602. If the state is at "function recommended" the state will remain at "function recommended" until any user customizations of customized provider code 610 are changed/evaluated for reliance on the function. If, however, all user code has been checked and there is no reliance on the function, then the state may be changed from "function recommended" to "function not provided."

Although FIG. 6 has been described in conjunction with code updates, in some embodiments the actual distribution may contain code updates, variable state updates (such as in conjunction with a data dictionary update), or some combination thereof. Thus, code may not always need to be distributed to update the tri-state variable.

Figure 7:
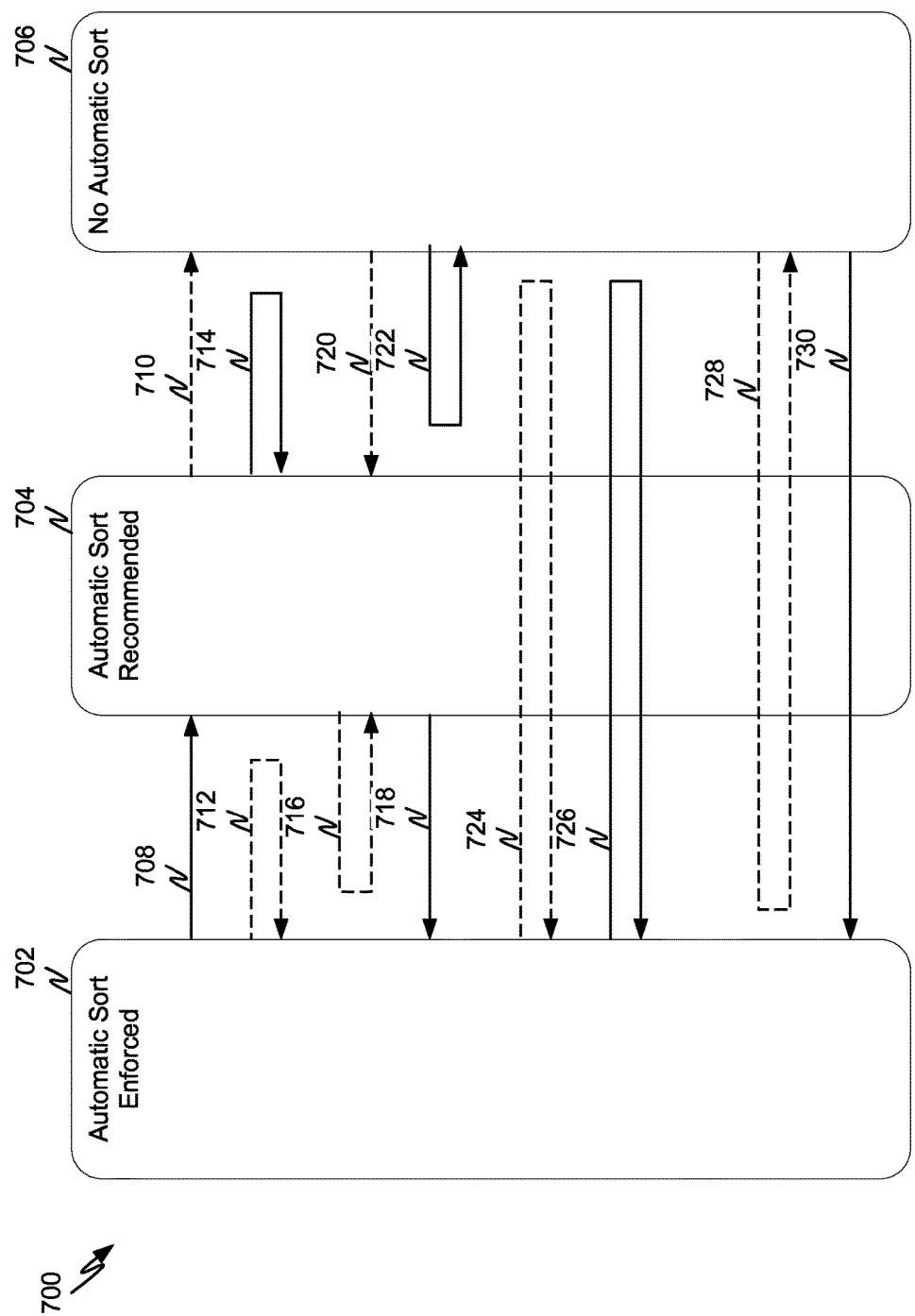
FIG. 7 is a diagram illustrating an example state transition diagram.

FIG. 7 is a diagram illustrating an example state transition diagram for a tri-state variable, shown generally as 700. The diagram illustrates three states, automatic sort enforced 702, automatic sort recommended 704 and no automatic sort 706. In the general case, these correspond to function enforced, function recommended, and function not provided, respectively. The runtime will provide automatic sorting of an associated table in the automatic sort enforced and automatic sort recommended states but will not provide automatic sorting of an associated table in the no automatic sort state.

The behavior of the system depends not only on the current state, but also on the entity requesting the state change. In FIG. 7, solid arrows represent state changes initiated by the owner of the tri-state variable (e.g., the provider) and dashed arrows represent state changes initiated by the user. In this description a state change and a request to change state will be treated the same as it does not matter what mechanism is used to change the state.

As previously discussed, the "normal" or "expected" state change path is from automatic sort enforced 702, to automatic sort recommended 704 to no automatic sort 706. The first of these transitions being made when the provide code is scrubbed and the second of these transitions being made when the user code is scrubbed. However, all state changes need to be addressed, and FIG. 7 illustrates an example embodiment to address them.

In general state changes are made/requested during design time and a design time environment (such as development environment 200 of FIG. 2) enforces the state transition diagram of FIG. 7. Thus a provider will usually request to change the state in its development environment. The resultant state is delivered to the user, perhaps along with associated code, and the design time/runtime environment of the user then enforces any changes requested by the user. However, in this description the general term "environment" is used with the understanding that the environment may be a development environment and/or runtime environment, as appropriate to the particular embodiment.

Automatic sort enforced 702 represents the state where the provide code relies on automatic sorting of the table. In general, user code may also rely on automatic sorting in this state, but it doesn't really matter and both reliance and non-reliance on automatic sorting may be covered, since in this state the runtime will provide automatic sorting of the table. A request to change the state from automatic sort enforced 702 to automatic sort recommended 704 initiated by the provider is illustrated by arrow 708. As indicated by the arrow, this is an allowed state change and no further action on the part of the environment need be taken.

A request to change the state from automatic sort enforced 702 to automatic sort recommended 704 initiated by the user is illustrated by arrow 712. As indicated in the diagram, such a state change is not allowed. This is because the automatic sort recommended state represents the state where the provider code no longer relies on automatic sort. A user is not authorized to make such a judgment. If such an attempt is made, the state will remain as automatic sort enforced 702. The environment may issue a warning or error message to indicate that the change is not allowed and optionally the reasons why.

A request to change the state from automatic sort enforced 702 to no automatic sort 706 is not allowed by either the provider or the user. This is because the no automatic sort state represents the state where neither the provider code nor the user code rely on automatic sort. No single entity (the provider or the user) can make that judgment for both sets of code. Thus, independent of whether the request is initiated by the provider (arrow 726) or the user (arrow 724), the state remains at automatic sort enforced and an error message and optionally the reason why may be issued. New data structures (such as tables) or new data structure types that have never had the functionality provided by the runtime may have the tri-state variable set initially to the no automatic sort state.

Automatic sort recommended state 704 represents the state where the provider code no longer uses the assumption that a sort will be provided. Thus a request to change from automatic sort recommended 704 to no automatic sort 706 by a user is successful as shown by arrow 710 since that state change indicates that the user code has now been checked and no longer relies on automatic sorting. However, the same request by the provider is unsuccessful as indicated by arrow 714. Again, the environment may issue an error message and/or reasoning.

A request to change the state from automatic sort recommended 704 to automatic sort enforced 702 by the user is not allowed since the user is not authorized to determine when a provider's code relies on an automatic sort. Thus, arrow

716 shows this request as unsuccessful. The environment may issue an error message and/or reasoning.

A request to change the state from automatic sort recommended 704 to automatic sort enforced 702 by the provider is allowed since the provider may determine that the provider's code relies on an automatic sort, even if a prior determination was made that it does not. Thus, arrow 718 shows this request as successful. However, such an "increase" in the automatic sort level may not preferred and the environment may issue warnings about the increase, even though it is allowed. Additionally, when a provider makes such an increase, the provider may wish to provide additional warning and/or notification to users about the increase to make sure they understand what has happened.

Once the no automatic sort 706 state has been reached, any subsequent increase in the automatic sort level may be accomplished, but may not be preferred. Thus, the environment may issue warnings even for changes that are allowed. Additional actions may also be taken in conjunction with the changes, such as providing notification or additional warnings to other parties.

A request to change the state from no automatic sort 706 to automatic sort recommended 704 signals a change from a state where both user code and provider code do not rely on automatic sort to a state where the user code may rely on automatic sort but the provider code does not. Thus, a request from a user to change the state from no automatic sort 706 to automatic sort recommended 704 is permissible as shown by arrow 720. However the same request from the provider is not permissible as shown by arrow 722. In this latter case, the environment may issue an error message and/or reasoning.

A request to change the state from no automatic sort 706 to automatic sort enforced 702 signals a change from a state where both user code and provider code do not rely on automatic sort to a state where the provider code relies on automatic sort but the user code may not. Thus, a request from a provider to change the state from no automatic sort 706 to automatic sort enforced 702 is permissible as shown by arrow 730. However the same request from the user is not permissible as shown by arrow 728. In this latter case, the environment may issue an error message and/or reasoning.

The state transition diagram of FIG. 7 is consistent and make sense in embodiments where both the environment of the provider and the embodiment of the user have full access to the current state. This generally means that the provider would somehow know when the user set the state to no automatic sort 706. However, in some embodiments, the provider will not have access to the user's current state. And since the provider generally distributes code to multiple users, the provider could not account for multiple conflicting user states. Thus, in such embodiments, the providers environment will be concerned with two states, automatic sort enforced 702 and automatic sort recommended 704. In this embodiment, only arrows 708 and 718 exist at the provider's environment. The environment may otherwise behave as discussed above.

Figure 8:
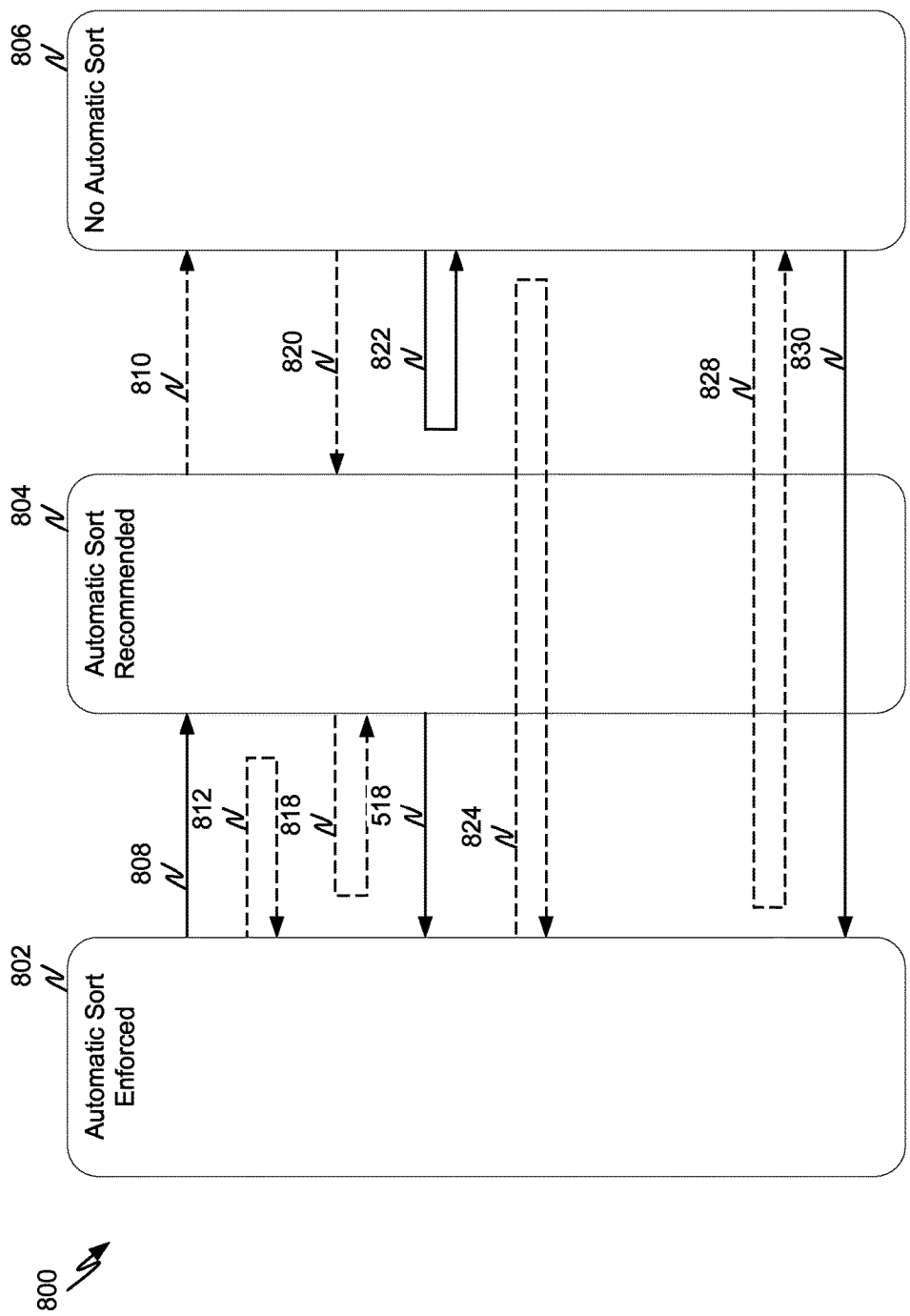
FIG. 8 is a diagram illustrating an example state transition diagram.

FIG. 8 illustrates the user environment and the possible state changes that it will need to handle in the above situation (e.g., where the provider's environment does not know the state at the user's environment). Common state transitions behave as discussed above. Thus, state transition 808 behaves the same way state transition 708 described above, and so forth. Similarly all user transitions (810, 812, 816, 820, 824 and 828) behave as described above (e.g. 710, 712, 716, 720, 724 and 728, respectively). The only differences from FIG. 7 are that the provider may transition to automatic sort recommended 804 and to automatic sort enforced 802 from state no automatic sort 806. This is because the provider has no knowledge when the user has set the state to no automatic sort 806.

When the user's environment receives a state change request from the provider of automatic sort recommended 804 and the user has already set the state to no automatic sort 806, there is no need to "increase" the sort level and the user's state of no automatic sort 806 "wins" and the system remains in that state. The situation is illustrated by arrow 822. This is because by setting the state to automatic sort recommended 804, the provider is signaling that its code no longer relies on automatic sort. Since the user's code also no longer relies on automatic sort (as evidenced by no automatic sort state 806), there is no need to revert to automatic sort recommended 804. This may true even when an update to customized provider code is received, since such code will not usually be deployed until the customizations are updated, if needed.

When the user's environment receives a state change request from the provider of automatic sort enforced 802 and the user has already set the state to no automatic sort 806, the automatic sort enforced state 802 "wins" and the state is set to automatic sort enforced 802. This is because by setting the state to automatic sort enforced 802, the provider is signaling that its code now relies on automatic sort. Thus, whatever the state of the user's code, the state must be "increased." This is illustrated by arrow 830. Appropriate notification and messages may be provided to the user upon this state change.

Figure 9:
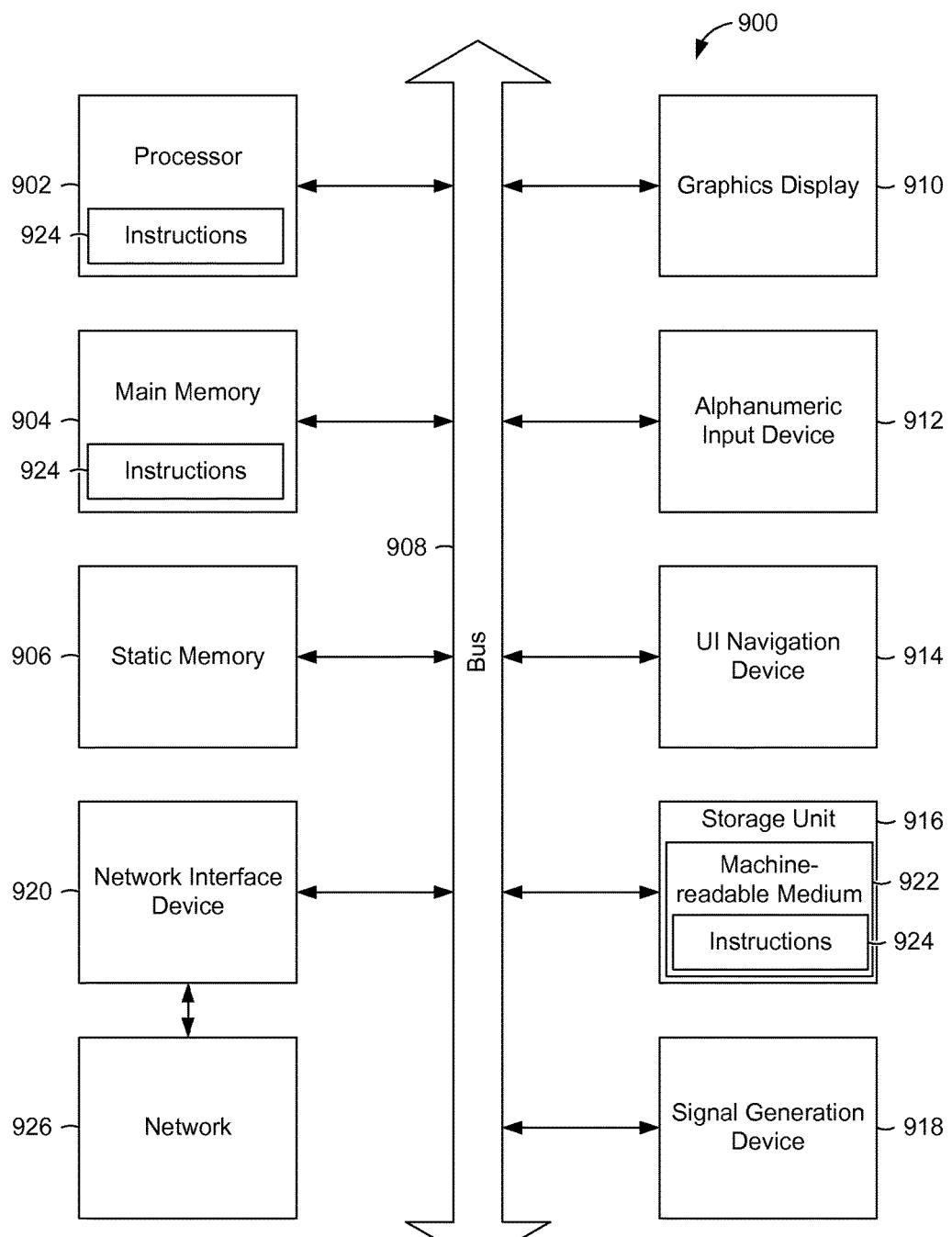
FIG. 9 is a block diagram of a computer processing system, within which a set of instructions for causing the computer to perform any one or more of the methodologies discussed herein may be executed.

FIG. 9 is a block diagram of a computer processing system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 900 includes processor 902 (e.g., a central processing unit (CPU), a graphics processing unit (GPU), advanced processing unit (APU) or some combination thereof), main memory 904 and static memory 906, which communicate with each other via bus 908. The processing system 900 may further include graphics display 910 (e.g., a plasma display, a liquid crystal display (LCD) or a cathode ray tube (CRT) or other display). The processing system 900 also includes alphanumeric input device 912 (e.g., a keyboard), a user interface (UI) navigation device 914 (e.g., a mouse, touch screen, or the like), a storage unit 916, a signal generation device 918 (e.g., a speaker), and a network interface device 920.

The storage unit 916 includes machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the processing system 900, with the main memory 904 and the processor 902 also constituting computer-readable, tangible media.

The instructions 924 may further be transmitted or received over network 926 via a network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method comprising:
   identifying a value of a tri-state variable associated with a data structure,
   the data structure utilized by a sequence of instructions executable on a processor,
   the value of the tri-state variable being selected from the group consisting of a function enforced state, a function recommended state, and a function not provided state;
   when the value of the tri-state variable is the function enforced state, providing a function upon execution of the sequence of instructions;
   when the value of the tri-state variable is the function recommended state, providing the function upon execution of the sequence of instructions;
   when the value of the tri-state variable is the function not provided state, not providing the function upon execution of the sequence of instructions; and
   further comprising enforcing a set of state transition rules on the value of the tri-state variable.

2. The method of claim 1 wherein the set of state transition rules comprises:
   when the value of the tri-state variable is the function enforced state, precluding changes to the value of the tri-state variable by entities other than a first entity until the first entity changes the value of the tri-state variable from the function enforced state to the function recommended state; and
   when the value of the tri-state variable is the function recommended state, allowing entities other than the first entity to change the value of the tri-state variable from the function recommended state to the function not provided state.

3. The method of claim 1 further comprising issuing a warning if an entity attempts to violate the state transition rules.

4. The method of claim 3, wherein the data structure is utilized by a second sequence of instructions provided by a second entity and wherein the value of the tri-state variable may be changed from the function recommended state to the function not provided state by the second entity.

5. The method of claim 1, wherein the sequence of instructions is provided by a first entity and wherein changing the value of the tri-state variable from the function enforced state to the function recommended state may only be performed by the first entity.

6. The method of claim 1, further comprising setting the value of the tri-state variable to indicate whether the sequence of instructions assumes the function will be provided.

7. The method of claim 1, wherein the value of the tri-state variable is set at the time the sequence of instructions are created or modified.

8. A system comprising:
memory;
a computer processor coupled to the memory;
instructions stored in the memory and executable by the processor, the instructions configuring the system to:
associate a tri-state variable with a table for use in a database, the tri-state variable having a value selected from the group consisting of an automatic sort enforced state, an automatic sort recommended state, and an automatic sort not provided state, the value of the tri-state variable determining whether automatic sorting is performed on the table at run time;
receive a request to change the value of the tri-state variable from a current value to a next value; and
enforce a set of state transition rules in order to determine whether to change the value of the tri-state variable from the current value to the next value, the state transition rules being dependent upon the entity, the current value, and the next value.

9. The system of claim 8, wherein the tri-state variable is associated with a table definition that defines the table.

10. The system of claim 9, wherein the table definition defines the table in a database independent manner and wherein the table definition resides in a data dictionary.

11. The system of claim 8, wherein the set of state transition rules comprises:
when the request is associated with a first entity and when the current value is the automatic sort enforced state and when the next value is the automatic sort recommended state, setting the value to the next value; and
when the request is associated with a second entity and when the current value is the automatic sort recommended state and when the next value is the automatic sort not provided state, setting the value to the next value.

12. The system of claim 11, wherein the set of state transition rules further comprises:
when the request is associated with the first entity and when the current value is the automatic sort recommended state and when the next value is the automatic sort enforced state, issuing a warning and setting the value to the next value; and
when the request is associated with the first entity and when the current value is the automatic sort not provided state and when the next value is the automatic sort recommended state and when the current value was set based on a request by the second entity, leaving the value at the current value.

13. The system of claim 8, wherein automatic sort is provided by a runtime environment when value of the tri-state variable is automatic sort enforced or automatic sort recommended and wherein automatic sort is not provided by the runtime environment when the value of the tri-state variable is automatic sort not provided.

14. A machine-readable storage medium comprising instructions that, when executed by at least one processor of a machine, configure the machine to:
receive a request to modify a value of a tri-state variable associated with a data structure from a current value to a next value, the current value and the next value being selected from a group consisting of a function enforced state, a function recommended state, and a function not provided state;
when the current value is the function enforced state, and when the next value is the function recommended state, set the value of the tri-state variable to the next value;
when the current value is the function recommended state, and when the next value is the function not provided state, set the value of the tri-state variable to the next value; and
when the current value is the function not provided state and when the next value is the function enforced state, issue a warning.

15. The machine-readable storage medium of claim 14, wherein the instructions further configure the machine to issue a warning when the current value is the function not provided state and when the next value is the function recommended state.

16. The machine-readable storage medium of claim 14, wherein the instructions further configure the machine to issue a warning when the current value is the function recommended state and when the next value is the function enforced state.

17. The machine-readable storage medium of claim 14, wherein the instructions further configure the machine to set the value of the tri-state variable to the next value when the current value is the function enforced state and when the next value is the function not provided state.

18. The machine-readable storage medium of claim 14, wherein the instructions further configure the machine to:
identify an entity associated with the request to modify the value of the tri-state variable; and
wherein when the current value is the function enforced state, and when the next value is the function recommended state, the instructions configure the machine to set the value of the tri-state variable to the next value when the entity associated with the request is a first entity; and
wherein when the current value is the function recommended state, and when the next value is the function not provided state, the instructions configure the machine to set the value of the tri-state variable to the next value when the entity associated with the request is the first entity or a second entity.

19. The machine-readable storage medium of claim 18, wherein the data structure is a table.

20. A method comprising:
identifying a value of a tri-state variable associated with a data structure,
the data structure utilized by a sequence of instructions executable on a processor,
the value of the tri-state variable being selected from the group consisting of a function enforced state, a function recommended state, and a function not provided state;
the value of tri-state variable being set at the time the sequence of instructions are created or modified;
when the value of the tri-state variable is the function enforced state, providing a function upon execution of the sequence of instructions;
when the value of the tri-state variable is the function recommended state, providing the function upon execution of the sequence of instructions; and
when the value of the tri-state variable is the function not provided state, not providing the function upon execution of the sequence of instructions.

* * * * *